United States Patent
Nelson

[11] 3,788,635
[45] Jan. 29, 1974

[54] MACHINE TOOL VISE
[75] Inventor: Leonard Nelson, Trumbull, Conn.
[73] Assignee: Custom Tool & Machine Co. Inc., Bridgeport, Conn.
[22] Filed: Apr. 12, 1972
[21] Appl. No.: 243,306

[52] U.S. Cl. .............................. 269/244, 269/219
[51] Int. Cl. ............................................. B25b 1/10
[58] Field of Search .................. 269/240–245, 201, 269/221, 222, 219

[56] References Cited
UNITED STATES PATENTS

| | | | |
|---|---|---|---|
| 2,274,428 | 2/1942 | Odin .............................. | 269/244 X |
| 3,208,744 | 9/1965 | Slifer .............................. | 269/247 |
| 1,406,981 | 2/1922 | Cumner .......................... | 269/240 X |
| 1,904,798 | 4/1933 | Nurnberger ..................... | 269/244 |
| 2,880,638 | 4/1959 | Muggli ............................ | 269/241 X |
| 2,499,124 | 2/1950 | Zipp et al. ...................... | 269/32 X |

Primary Examiner—Harold D. Whitehead
Assistant Examiner—Harold P. Smith, Jr.
Attorney, Agent, or Firm—Johnson and Kline

[57] ABSTRACT

A machine tool vise having a base with five squared sides including a planar bottom adapted to be releasably mounted on a worktable of a machine tool and the like and having the same overall length regardless of the extent to which the fixed and movable jaws are separated, the movable jaw being slidably mounted on a wide rail secured to end blocks in which a plurality of laterally spaced feed screws are mounted for rotation in thrust-absorbing means, the feed screws being located beneath said wide rail, each feed screw having a gear fixed thereto and a driving gear located between and meshing with said gears to cause the screws to rotate in unison, said driving gear having a socket to removably receive a wrench or the like for rotating said gears and said feed screws to cause the latter to open or close the jaws, the wide rail being located in a horizontal plane above that of the feed screw and serves as a horizontal support for a workpiece placed between the fixed and movable jaws.

1 Claim, 10 Drawing Figures

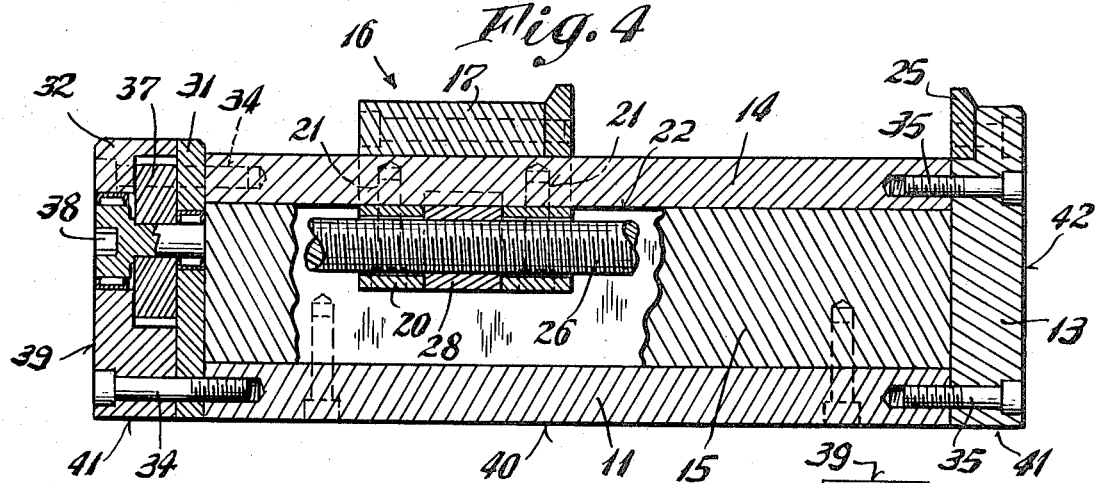
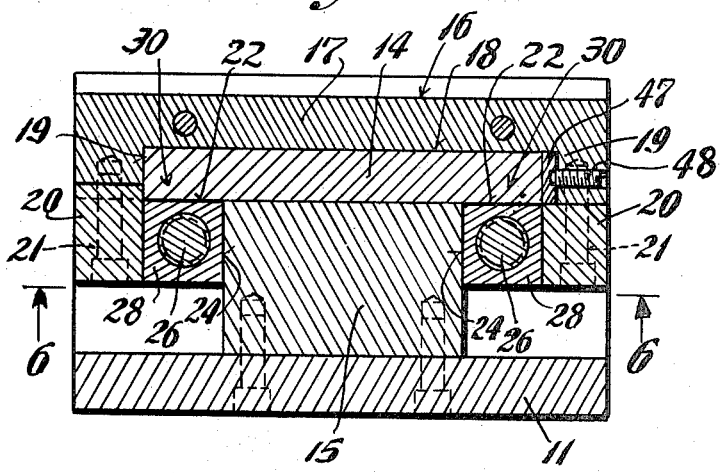
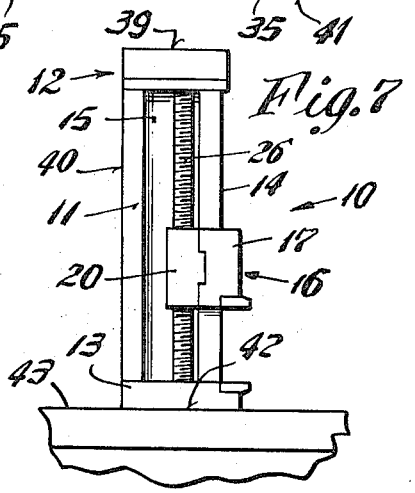
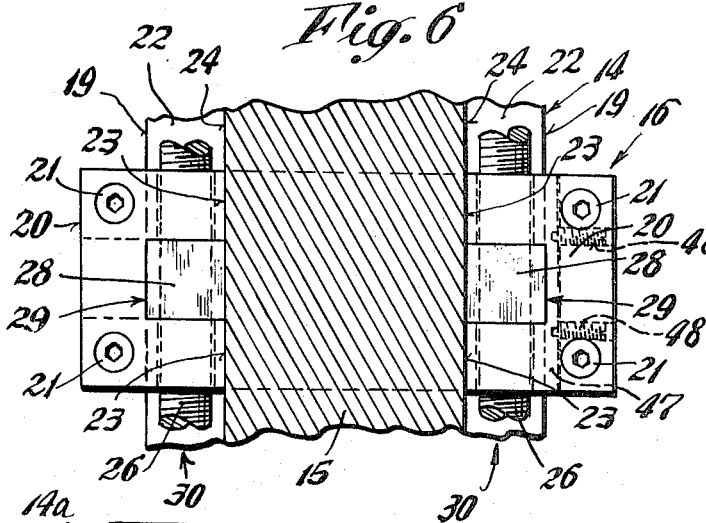
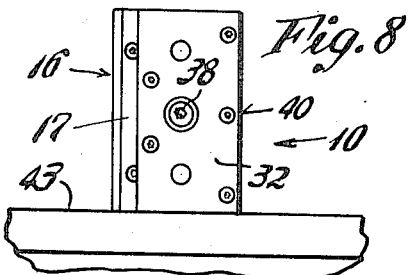
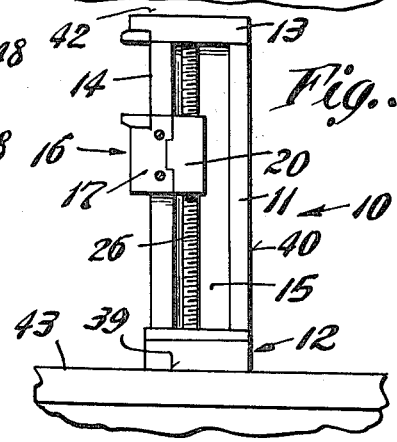
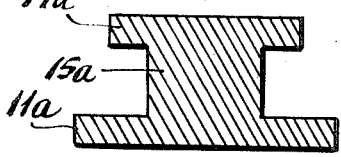

MACHINE TOOL VISE

This invention relates to a vise for holding workpieces on the worktable of machine tools, particularly workpieces the surfaces of which are to be worked upon in a grinding machine or the like.

In the art of tool making and precision manufacturing of critical parts or machines, it has been desired to have a vise which can conveniently be used to hold workpieces on the tables of machine tools, such as milling machines, planing machines and grinding machines and the like, especially a vise which can be mounted on a magnetic worktable or other support on five of its six sides — that is to say, on the bottom, right side, left side, right end and left end; in other words, a vise which may be supported on any side but the top side.

To satisfy this want, applicant has provided a frame structure for a vise with a flat planar bottom plate and sturdy end pieces secured to the bottom plate and so disposed that the top and side edges of the end pieces are finished flat and square with each other and with the bottom plate.

For this and other reasons, the vise of the present invention is so constructed that no parts of the vise protrude beyond the planes in which the bottom and top and side surfaces of the end pieces lie.

It has long been a problem in designing a small vise with a large amount of open capacity and yet keep the base length small. For example, a conventional vise in which the movable jaw moves outwardly from the fixed jaw along with the screw and has an opening of say 5 inches, would normally have an overall length of approximately 19 inches when open. In the situation in which the feed screw was not actually movable but was located above the rail on which the movable jaw travels, the nut being on the movable jaw, the base of the vise had to be several times longer than the space between the jaws when open. This was because the movable jaw required sufficient length to contain the end of the feed screw, the axis of which was in a horizontal plane vertically above that in which the movable jaw moves.

This problem was solved by the present invention by fixing the feed screw means against axial movement, extending it along the base between end blocks and locating the feed screw means in a plane below that of the rail on which the movable jaw travels.

To move the movable jaw toward and from the fixed jaw, it has been proposed heretofore to provide two parallel feed screws between the jaws in an effort to keep the working surfaces of the jaws exactly parallel even when engagement of the work with the jaws is close to the outer edges of the jaws. However, such proposals involve moving the movable jaw, screw and crank away from the fixed jaw, thus elongating the vise and making it inconvenient or sometimes impossible to use the vise on the table of a machine tool.

This condition is avoided by the present invention by fixing the feed screw against axial movement and providing the movable jaw with a nut for each feed screw and mounting the feed screws so as to lie in a plane below the plane in which the movable jaw travels.

Another important feature of this invention is the provision of means for protecting the feed screw from being damaged by engagement with tools or other articles and against chips and/or particles ground off the work from falling on the feed screws. This is accomplished by mounting the feed screw under and close to the overhanging edges of the rail on which the movable jaw travels.

As will be seen, applicant has overcome the disadvantageous features of the prior proposals and yet has produced a simpler, sturdier and more reliable vise for the purpose stated.

Other features and advantages will hereinafter appear.

In the accompanying drawings:

FIG. 4 is a transverse section taken on the line 4—4 of FIG. 1.

FIG. 5 is a longitudinal section taken on the line 5—5 of FIG. 2, with portions of the rail-supporting block broken away to show the feed nut and feed screw.

FIG. 6 is a fragmentary bottom plan view of the movable jaw taken on the line 6—6 of FIG. 5.

FIG. 7 shows a portion of a worktable and a vise of the present invention having one end resting thereon.

FIG. 8 is a similar view showing the vise of the present invention having one side resting on the worktable.

FIG. 9 is like FIG. 7 with the vise resting on its other end.

FIG. 10 is a cross-sectional view showing the rail, the rail support and the base made from one integral piece of metal.

Figure 1:
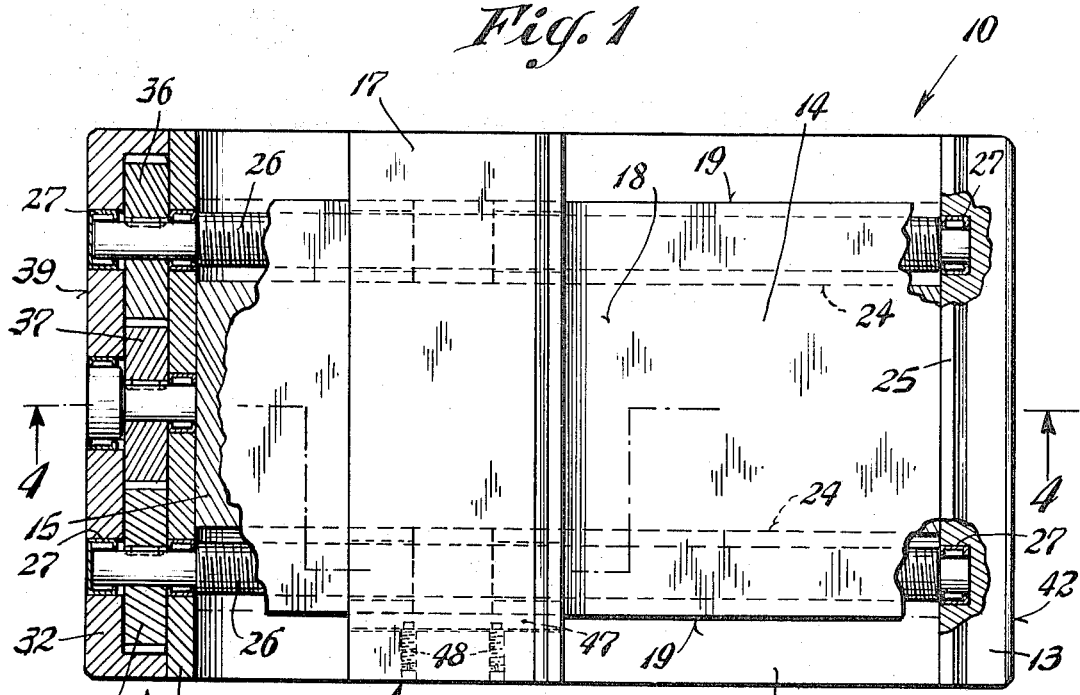
FIG. 1 is a plan view of the vise of the present invention.

As shown in the accompanying drawings, the presently preferred form of the present invention comprises a body 10 having a bottom plate 11, end pieces 12 and 13, a rail 14 and a rail-supporting block 15.

Slidably mounted on the rail 14 is a movable jaw 16 having an upper member 17 engaging the top surface 18 and adjacent side surfaces 19 of the rail 14 and lower members 20 secured to the upper member 17 by screws 21 and engaging the bottom surface 22 and side surface 19 of the rail 14. The surfaces 23 of the lower members 20 engage the surfaces 24 of the rail-supporting block 15.

As shown in FIGS. 5 and 6, a gib 47 backed by set screws 48 may be placed between the surface 19 of the rail and adjacent surface of the upper portion of the movable jaw to take up lost motion of the movable jaw laterally of the rail and to compensate for wear.

To move the movable jaw 16 to and from a fixed jaw 25 on the end block 13, there are provided two feed screws 26 which are mounted in the thrust-absorbing means 27 in the end pieces 12 and 13. Mounted on each feed screw 26 is a feed nut 28 which is located in a cutout 29 in each lower member 20 of the jaw 16. The dimensions of the width of the nut 28 and the cutout 29 are such that the nut may float slightly vertically to avoid binding of the nut on the screw.

When the vise is assembled, rotation of the feed screw 26 by engagement with the nuts 28 will cause the movable jaw 16 to slide along the rail and be advanced toward or withdrawn from the fixed jaw depending on the direction in which the screws 26 are rotated.

By having the rail 14 wide so that the edges 30 are spread apart a substantial distance and having the feed screws located under the edge portion 30 of the rail 14, the movable jaw 16 will be advanced and withdrawn from the fixed jaw with equal force at both sides without any skewing or twisting movement.

Also, when the rail 14 is wide and planar as shown, its top surface 18, being clear of any obstructions, forms a satisfactory table to support a workpiece while the latter is being clamped between the jaws.

Besides, when the screws 26 are located under the projecting edge portions 30 of the rail and inwardly of the sides of the movable jaw, they are protected against being damaged by being struck by other objects. Since the screws 26 are under the edge portions 30 of the rail 14, grindings and/or chips are prevented from falling directly on or in the threads of the screws.

In the form of the invention herein illustrated, the end piece 12 has two parts, an inner plate 31 which engages the end of the rail 14 and rail-supporting block 15, and an outer plate 32 which engages the inner plate 31 and is secured to the rail 14 and base plate 11 by counterbored screws 34. The end piece 13 is secured to the rail 14 and bottom plate 11 by screws 35.

Mounted on the end of each feed screw 26 and located in a cavity between said plates 31 and 32 is a gear 36. Mounted in bearings in the plates 31 and 32 is a gear 37 meshing with the gears 36 and which has a wrench socket 38 countersunk or at least flush with the surface 39 of the plate 32. When the socket wrench is inserted in the socket 38 and rotated, both screws will rotate in unison to move the movable jaw 16 toward or from the fixed jaw 25. When the socket wrench is removed, the vise can be used with the end surface 39 engaging the worktable of the machine tool.

It should be noted that all surfaces of the vise of this invention are within the overall dimension of the body 10 in all positions of the movable jaw; also, that the distance to which the jaws may be separated is limited only by the width of the movable jaw 16 and the length of the rail 14 and feed screws 26.

Figure 2:
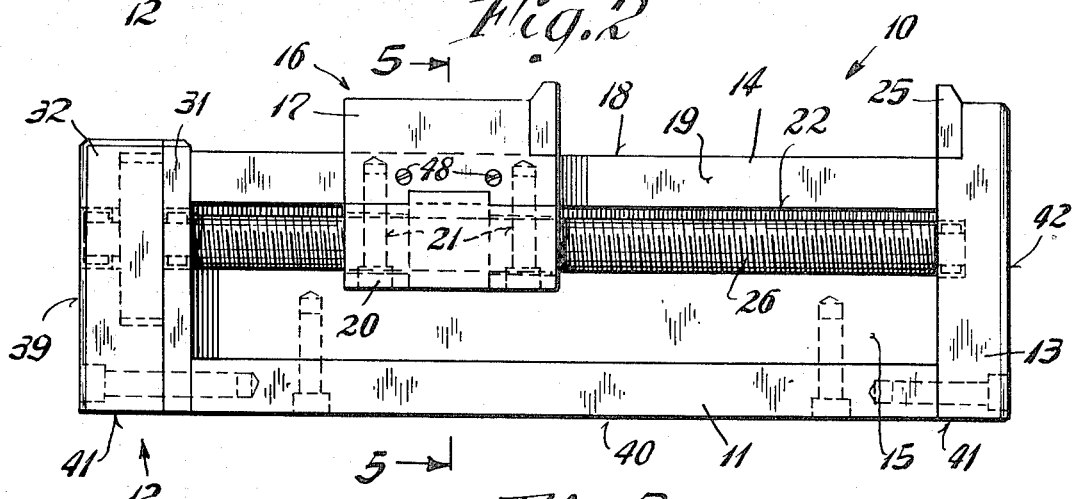
FIG. 2 is a side elevation.
Figure 3:
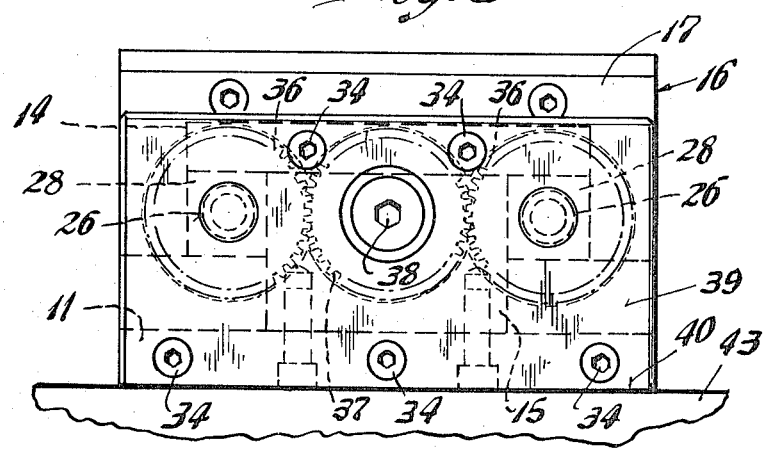
FIG. 3 is a view of one end of the body.

According to this invention in its preferred form, the surface 40 of the bottom plate 11 and the bottom surface 41 of the end pieces 12 and 13 are finished and flush with each other and the surfaces 39 and 42 of the end pieces are square with the surfaces of the bottom plate. Hence, the vise of the present invention can support on any one of five of its sides on a flat worktable surface 43 as shown in FIGS. 2, 7, 8 and 9 in which positions a workpiece is accessible for tool engagement.

The lead of the screw threads on the screws 26 and the pitch of the gears will, of course, depend on the character of the work to be performed and the precision required.

The body of the vise for convenience sake has been described as though the base plate 11, end blocks 12 and 13, rail support 15 and rail 14 were physically separate pieces, which they may be. However, it is within the scope of this invention to make some or all of said elements integral. For instance, in FIG. 10 the rail 14a, the rail support 15a and the base plate 11a may be formed integrally from a single piece of metal.

The surfaces of the various parts whether made in one or more pieces are finished true and square relative to each other in order to obtain the advantages of being able to support the body 10 on various portions of its surfaces.

Variations and modifications may be made within the scope of the claims and portions of the improvements may be used without others.

I claim:

1. A machine tool vise having a planar base plate adapted to be mounted on and releasably secured to the worktable of a machine tool; an end block on each end of said base plate; rail means; rail-support means centrally located on said base plate and extending upwardly therefrom between said end blocks; a fixed jaw on one of said end blocks; a movable jaw slidably mounted on said rail means, said rail means comprising a plate extending longitudinally between said end blocks and transversely across the vise to form a support for a workpiece fitting between the jaws while said movable jaw is being moved into or out of clamping engagement with the workpiece, said plate having longitudinal side edge portions extending laterally substantially beyond said rail-support means, said movable jaw having lateral extensions extending substantially beyond said plate; one at each longitudinal side edge portion of said plate, and downwardly extending portions engaging said longitudinal side edge portions of said plate to be guided thereby; feed screw means extending between and mounted to rotate in said end blocks and fixed against axial movement, said feed screw means comprising a pair of laterally spaced feed screws; nut means on said downwardly extending portions of said movable jaw engaging said screw means to drive the movable jaw to and from the fixed jaw, said screw means and nut means being located under said lateral extensions of said plate and closely adjacent said rail-support means whereby protection against damage is afforded said screw means and the movable jaw may travel on said rail means the full distance between said end blocks; and means for rotating said screws in unison.

* * * * *